United States Patent [19]

Fleischmann et al.

[11] Patent Number: 4,979,931
[45] Date of Patent: Dec. 25, 1990

[54] DIFFERENTIAL GEAR AND CONTROL SYSTEM FOR MOTOR VEHICLES HAVING A SINGLE DRIVEN AXLE AND AT LEAST ONE UNDRIVEN AXLE

[75] Inventors: Otwin Fleischmann, Nieder-Olm, Fed. Rep. of Germany; Hans D. Sommer, Graz, Austria; Erich Erhart, Graz/St. Peter, Austria; Johann Koch, Graz, Austria

[73] Assignee: Steyr-Daimler-Puch AG, Vienna, Austria

[21] Appl. No.: 336,765

[22] Filed: Apr. 12, 1989

[30] Foreign Application Priority Data

Apr. 20, 1988 [AT] Austria ............................. 1009/88

[51] Int. Cl.$^5$ ............................................. F16H 1/44
[52] U.S. Cl. ..................................... 475/234; 180/338; 475/231
[58] Field of Search ................. 74/710.5, 711, 866; 192/85 V, 103 F; 475/231, 234, 237, 239; 180/249, 250, 337, 338, 348

[56] References Cited

U.S. PATENT DOCUMENTS

| | | | |
|---|---|---|---|
| 3,498,154 | 3/1970 | Müller-Berner | 74/710.5 |
| 3,789,965 | 2/1974 | Heidorn | 192/85 V |
| 3,871,249 | 3/1975 | Jeffers | 74/711 |
| 4,679,463 | 7/1987 | Ozaki et al. | 74/711 |
| 4,821,601 | 4/1989 | Ouchi | 74/711 |
| 4,864,894 | 9/1989 | Falzoni | 74/866 |

FOREIGN PATENT DOCUMENTS

| | | | |
|---|---|---|---|
| 0128477 | 12/1984 | European Pat. Off. | |
| 0233587 | 8/1987 | European Pat. Off. | |
| 3117105 | 11/1982 | Fed. Rep. of Germany | |
| 3637820 | 5/1987 | Fed. Rep. of Germany | |
| 61-132420 | 6/1986 | Japan | 74/711 |
| 63-106140 | 5/1988 | Japan | 180/338 |
| 1115928 | 9/1984 | U.S.S.R. | 74/711 |
| 1220946 | 3/1986 | U.S.S.R. | 74/711 |
| 2059523 | 4/1981 | United Kingdom | |
| 2115506 | 9/1983 | United Kingdom | 74/710.5 |
| 2141513 | 12/1984 | United Kingdom | |

OTHER PUBLICATIONS

Japan Abstracts, vol. 10, No. 130 (M-478) (2187) (May 14, 1986).

Primary Examiner—Rodney H. Bonck
Assistant Examiner—Benjamin Levi
Attorney, Agent, or Firm—Marmorek, Guttman & Rubenstein

[57] ABSTRACT

A differential gear and control system for motor vehicles having a single driven axle and at least one undriven axle comprises a differential gear and a differential lock, which is adapted to be controlled in dependence on the speed of travel of the vehicle. In order to increase the traction when the vehicle is started whereas the handling of the vehicle should not adversely be affected by a locking of the differential gear, the differential lock is adapted to be controlled so that it exerts on the differential gear a restraining torque which decreases as the speed of travel of the vehicle increases from zero to a predetermined speed of travel.

13 Claims, 1 Drawing Sheet

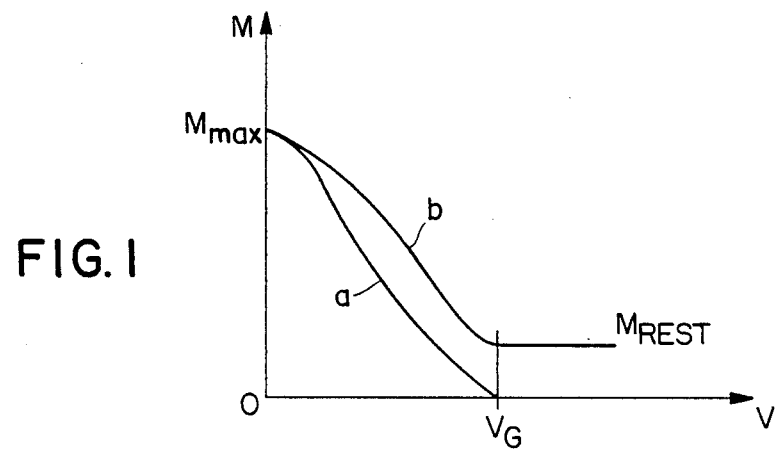
FIG.1
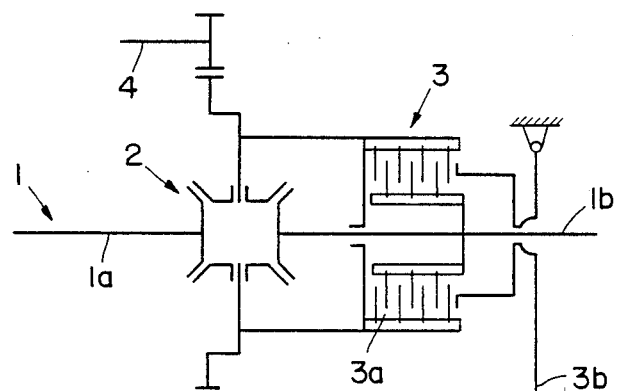
FIG.2
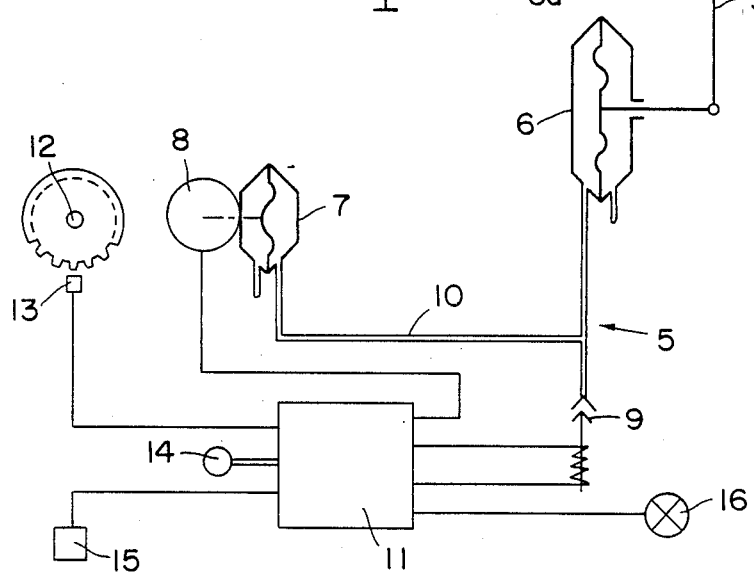

DIFFERENTIAL GEAR AND CONTROL SYSTEM FOR MOTOR VEHICLES HAVING A SINGLE DRIVEN AXLE AND AT LEAST ONE UNDRIVEN AXLE

FIELD OF THE INVENTION

This invention relates to a differential gear and control system for motor vehicles having a single driven axle, which preferably consists of the front axle, and at least one undriven axle, which system comprises a differential lock which is adapted to be controlled in dependence on the speed of travel of the vehicle.

DESCRIPTION OF THE PRIOR ART

The traction of motor vehicles can considerably be increased by differential locks particularly when different friction values occur at the two wheels of a driven axle. On the other hand, locked differential gears will increase the wear and the fuel consumption and will also influence the handling of the vehicle. The adverse effects of said influences will increase as the speed of travel of the vehicle increases. The effects of the locked differential gear will be particularly undesirable in vehicles having a front wheel drive because in that case the differential lock will result in fluctuations of the steering moment and will thus reduce the directional stability and the safety of travel of the vehicle.

In order to permit a utilization of the advantages afforded by the provision of a differential lock whereas the disadvantages of locked differential gears are limited, it has been proposed to provide controllable differential locks and differential gears have been disclosed which are adapted to be locked in dependence on the speed of travel of the vehicle. For instance, EP-A2-0 233587 proposes to lock the differential gears when the slip of the driven wheels relative to each other reaches or exceeds a predetermined limit and that limit is controlled in dependence on the speed of travel so that a relative slip which is induced by a steering action will not result in an undesired action. To that end a higher limit is set for the relative slip when the vehicle is traveling at a relatively low speed and a lower limit is set when the vehicle is traveling at a relatively high speed. That system for controlling the differential lock is mainly intended for agricultural tractors having cross-country mobility and is intended to maintain the conventional differential lock during an operation under normal conditions whereas an undersired operation of said lock as a result of a steering action when the vehicle is traveling at a very low speed is to be prevented. In that case as well as with other means for controlling the differential lock in dependence on the speed of travel the control will result only in an on-off action so that the lock will exert either a maximum or a minimum restraining torque and may often result in dangerous abrupt changes of the handling of the vehicle.

EP-A1-0 128 477 discloses for a differential lock an automatic control system that includes two control units. The first control unit is responsive to at least one operational parameter of the vehicle, e.g., the speed of travel of the vehicle, and merely acts to unlock the differential gear when said operational parameter reaches or exceeds a predetermined value. The second control unit is responsive to another operational parameter of the vehicle, such as an operational parameter of the steering system, and will automatically lock the unlocked differential gear when said second parameter has reached a predetermined value. That automatic control system is also designed for agricultural tractors and is mainly intended to ensure that the steering system will not adversely be affected by a locked differential gear. That automatic control system will permit a control of the lock in dependence on two or more operational parameters of the vehicle so that extensive feedback loops, switching means and actuators will be required. Besides, the differential gear can either be fully locked or entirely unlocked but the locking torque cannot be adapted to various conditions.

DE-A-36 37 820 discloses a differential gear which is provided with a controlled differential lock, which exerts a slip-limiting torque that is varied in dependence on operating conditions of the vehicle. The control parameters are, inter alia, the speed of travel of the vehicle and the instantaneous characteristic of a variable spring suspension of the vehicle and the lock is continuously controlled in that the restraining torque is adjusted in dependence on the behavior of the spring suspension in accordance with the instantaneous conditions of travel so that an optimum ride comfort will be ensured. The differential lock is constituted by a hydraulic operable friction clutch, which is provided with a pressure control valve for controlling the hydraulic pressure which is applied to actuate the clutch. The arrangement involves a high structural and control expenditure and cannot be used to improve merely the starting behavior of vehicles.

SUMMARY OF THE INVENTION

It is an object of the invention to eliminate the disadvantages outlined hereinbefore and to provide a differential gear and control system which is of the kind described hereinbefore and which is capable of increasing the traction of a motor vehicle to the desired extent in a simple, functionally reliable manner during the starting operation whereas it will not adversely affect the handling of the vehicle.

That object is accomplished in accordance with the invention by the provision of control means for controlling the differential lock so that the restraining torque exerted by the differential lock will gradually decrease as the speed of travel increases from a standstill of the vehicle to a predetermined value.

That control of the differential lock involves only a low expenditure and will ensure that the highest restraining torque will be exerted exactly when the highest traction is required, i.e., when the vehicle begins to move, and will decrease as the speed of travel increases. As a result, the differential lock will not adversely affect the handling of the vehicle even at low starting speeds and nevertheless the differential lock will exert its full effect in improving the starting behavior of the vehicle. When the vehicle has been started, the differential lock will be inoperative when the speed of travel has exceeded the predetermined limit and the handling of the vehicle will then be influenced by the differential action of the differential gear.

The differential lock can be entirely disabled when the speed of travel of the vehicle is at or above the predetermined value so that the restraining torque will then entirely be eliminated. Alternatively, the differential lock may be controllable to exert a constant residual restraining torque when the speed of travel is at or above said predetermined value so that the differential lock will influence the traction and handling of the vehicle throughout the range of possible speeds of travel.

In a particularly desirable embodiment the differential lock consists of a non-positive clutch, which is controlled by a clutch actuator in dependence on the speed of travel that is detected by a speed-of-travel sensor. The actuator may be arranged to actuate the clutch in an engaging sense and in a disengaging sense in dependence on the pressure applied to said actuator and may be provided with a controllable pressure regulator for controlling said pressure in dependence on the speed of travel and the speed-of-travel sensor may be constituted by a speed sensor for detecting the speed of an undriven axle of the vehicle. Owing to the provision of such a pneumatic system for increasing and decreasing the restraining torque exerted by the differential lock the arrangement may be designed to be structurally simple, functionally reliable and inexpensive. The speed of the undriven axle of the vehicle will constitute an exact measure of the speed of travel. The pressure which is applied to the clutch actuator will depend on the detected speed of the undriven axle and will ensure that the clutch will be actuated to assume the desired engaged position in which the restraining torque will be limited as desired. A robust and inexpensive system for controlling the differential will thus be obtained.

Within the scope of the invention the clutch actuator may desirably comprise a vacuum-responsive diaphragm, which is contained in a chamber which communicates with a vacuum source, preferably with a vacuum pump, and is connected to said clutch by a clutch-actuating linkage. Such a vacuum-responsive diaphragm will constitute a maintenance-free and functionally reliable device for actuating a clutch-actuating linkage. The line which connects the pump or other vacuum source to the chamber which contains the diaphragm constitutes a pneumatic link, which facilitates the installation of the clutch actuator and which permits the vacuum source to be installed at any desired distance from the clutch-actuating linkage.

The pressure regulator may be constituted by the vacuum source, such as the vacuum pump or a vacuum accumulator which is connected to the intake pipe of the engine of the motor vehicle. In a preferred arrangement the pressure regulator consists of an air-admitting valve for controlling the vacuum in the vacuum system whereas the action of the vacuum source is constant.

If the pressure regulator is adapted to be controlled by pulses at a frequency depending on the speed of travel of the vehicle, the pressure can be controlled in a particularly effective manner because the pulse-controlled intermittent operation of the pump or the pulse-controlled intermittent opening of the air-admitting valve will permit the vacuum to be controlled economically and without a risk of trouble.

In a motor vehicle provided with an antilock system, said system should not be adversely affected by the differential lock. This may be accomplished in accordance with the invention in that the control means are arranged to disable the differential lock in response to a brake application. In that case the differential lock can be combined with an antilock system of any desired kind.

BRIEF DESCRIPTION OF THE DRAWING

FIG. 1 is a graph in which the restraining torque exerted by a differential lock in a system in accordance with the invention is plotted against the speed of travel of the vehicle.

FIG. 2 is a diagram illustrating the differential gear and control system in accordance with the invention.

DETAILED DESCRIPTION OF THE PREFERRED EMBODIMENT

An illustrative embodiment of the invention will now be described more in detail with reference to the drawing.

The driven axle 1 of a motor vehicle which has a single driven axle, which preferably consists of the front axle, is provided with a differential gear 2, which can be locked by a differential lock 3 for improving the starting behavior of the vehicle. Because the handling of the vehicle should not adversely be affected by the differential gear 2 when it is locked, the differential lock 3 is controlled to exert a restraining torque which decreases as the speed of travel of the vehicle increases from a standstill of the vehicle to a predetermined value. FIG. 1 is a graph in which the restraining torque M is plotted against the speed of travel v. It is apparent from that graph that the maximum restraining torque $M_{max}$ will be exerted when the vehicle is at a standstill or has the speed of travel $v=0$. The restraining torque M decreases along the curve a as the speed of travel increases to a value $v_G$. The restraining torque becomes zero when the speed of travel has reached the value $v_G$ because the differential lock 3 is then disabled. Alternatively the differential lock 3 may be controlled to exert a locking torque M which decreases from the initial restraining torque $M_{max}$, which is exerted when the vehicle is at a standstill, along the curve b to a residual restraining torque $M_{Rest}$, which will be exerted when the speed of travel has reached the value $v_G$ and which will be maintained constant even when the speed of travel exceeds the value $v_G$ so that handling of the vehicle will be influenced by said residual restraining torque at higher speeds of travel. If the restraining torque is varied in dependence on the speed of travel of the vehicle in accordance with curve a or b, the high restraining torque which is exerted during the starting of the vehicle will ensure that the desired higher traction will then be obtained also, the decrease of the restraining torque as the speed of travel increases and the exertion of a residual restraining torque or a zero locking torque at speeds of travel above a predetermined value ensure that the differential lock will not adversely affect the handling of the vehicle at speeds of travel in excess of $V_G$. This is because the differential lock will then exert only a relatively low residual restraining torque or will not exert a restraining torque at all depending on whether curve a or b is followed.

In the illustrative embodiment shown in FIG. 2 the driven front axle 1 of the vehicle comprises the differential gear 2, which is provided with the differential lock 3. The differential gear 2 transmits the driving torque from the driving shaft 4 to the two axle shafts 1a, 1b of the front axle and divides said driving torque in dependence on the respective moments of resistance which are encountered. The differential gear 2 is provided with a differential lock 3, which consists of a multiple-disk clutch 3a for restraining the differential action of the differential gear 2 by exerting a restraining torque in dependence on the extent to which the clutch 3a is engaged.

The multiple-disk clutch 3a is adapted to be actuated in an engaging sense and in a disengaging sense by a clutch-actuating linkage 3b, which is operable by a clutch actuator 5, which is responsive to pressure. The actuator comprises a vacuum-responsive diaphragm, which is connected to the clutch 3a by the clutch-actuating linkage 3b and is contained in a chamber 6 that communicates with a vacuum pump 7, which is operable by a motor 8. During an operation of the vacuum pump 7 the vacuum applied to the diaphragm will cause the clutch-actuating linkage 3b to move in the clutch-engaging sense to an extent which will depend on the vacuum applied to the diaphragm. That vacuum can be controlled in a simple manner by an air-admitting valve 9 that is connected to the line 10 through which the chamber 6 communicates with the pump 7.

The differential lock 3 is controlled by a controller 11, which is supplied by a speed sensor 13 with a pulsed signal at a frequency which represents the speed of the undriven rear axle 12 of the vehicle as a measure of the speed of travel of the vehicle. In dependence on that signal the controller controls the air-admitting valve 9 so that the latter admits atmospheric air to control the vacuum applied to the clutch actuator 5 in dependence on the speed of travel. If the vacuum pump 7 is operated continuously and the air-admitting valve 9 is intermittently opened under pulse control, the vacuum applied to the clutch actuator 5 will be controlled as desired and the differential lock 3 will be engaged to a larger or smaller extent in dependence on the speed of travel.

A manually operable switch 14 permits the differential lock 3 to be manually controlled. A brake-responsive switch 15 is also provided, which will cause the controller 11 to disable the differential lock 3 in response to a brake application so that the differential gear 2 can be combined with an antilock system of any desired kind. Indicating lights 16 are provided to permit a supervision of the control of the differential lock 3. It will be understood that the entire system can be energized and de-energized by the ignition key and the controller 11 will cause the vacuum pump 7 to operate only when this is required.

We claim:

1. A differential gear and control system for a motor vehicle having a single driven axle and at least one undriven axle, comprising
   a differential gear for said driven axle,
   a differential lock which exerts a restraining torque on said differential gear, and
   control means for detecting a speed of travel of the vehicle and for controlling the restraining torque exerted by said differential lock on said differential gear so that said restraining torque is at a maximum value when said vehicle is at a standstill, and so that said restraining torque gradually and continuously decreases from said maximum value to a minimum value as said speed of travel increases from standstill to a predetermined speed of travel.

2. The differential gear and control system of claim 1 wherein said minimum value of said restraining torque is zero.

3. The differential gear and control system of claim 1 wherein said minimum value of said restraining torque is greater than zero, said differential lock exerting said minimum value restraining torque when said speed of travel is equal to or greater than said predetermined speed of travel.

4. The differential gear and control system of claim 1 wherein said single driven axle is a front axle.

5. The differential gear and control system of claim 1 wherein said motor vehicle is provided with braking means, further comprising
   means for disabling said differential lock in response to an application of said braking means.

6. The differential gear and control system of claim 1 wherein
   said differential lock comprises a non-positive clutch which exerts said restraining torque on said differential gear, and
   said control means comprises a sensor for generating output pulse signals representing said speed of travel, and a clutch actuator for actuating said clutch in an engaging and in a disengaging sense in dependence on said output pulse signals,
   said differential gear and control system further comprising
   vacuum-applying means connected to said clutch actuator for applying a vacuum to said clutch actuator,
   said clutch actuator being operable to actuate said clutch in an engaging sense and in a disengaging sense in dependence on the pressure applied to said clutch actuator, and
   a pressure regulator connected to said vacuumapplying means for controlling the pressure applied to said actuator in dependence on said output pulse signals.--

7. The differential gear and control system of claim 6 wherein said non-positive clutch comprises a multiple disk clutch.

8. The differential gear and control system of claim 6 wherein said sensor is operative to detect a rotational speed of said at least one undriven axle as a measure of said speed of travel.

9. The differential gear and control system of claim 6, wherein
   said sensor is operative to generate output pulse signals at a frequency representing said speed of travel.

10. The differential gear and control system of claim 6, wherein
    said clutch actuator comprises a diaphragm in a chamber, which communicates with said vacuum-applying means and a linkage connecting said diaphragm to said clutch, and
    said pressure regulator is operative to control the pressure in said chamber in dependence on said output pulse signal.

11. The differential gear and control system of claim 10, wherein said vacuum-applying means comprises a vacuum pump.

12. The differential gear and control system of claim 10, wherein said pressure regulator comprises valve means for admitting atmospheric air in pulses to said clutch actuator in dependence on said output pulse signals.

13. The differential gear and control system of claim 12, wherein
    said clutch actuator is operative to actuate said clutch in an engaging sense to an extent depending on the vacuum in said chamber,
    said sensor is operative to generate output pulse signals at a frequency representing said speed of travel, and
    said valve means is operative in pulses at the frequency of said output pulse signals to admit atmospheric air to said chamber.

* * * * *